Sept. 24, 1940.  E. C. HATCHER  2,215,926
RESILIENT SLEEVE IN TRANSMISSION GEARING
Filed Jan. 3, 1938
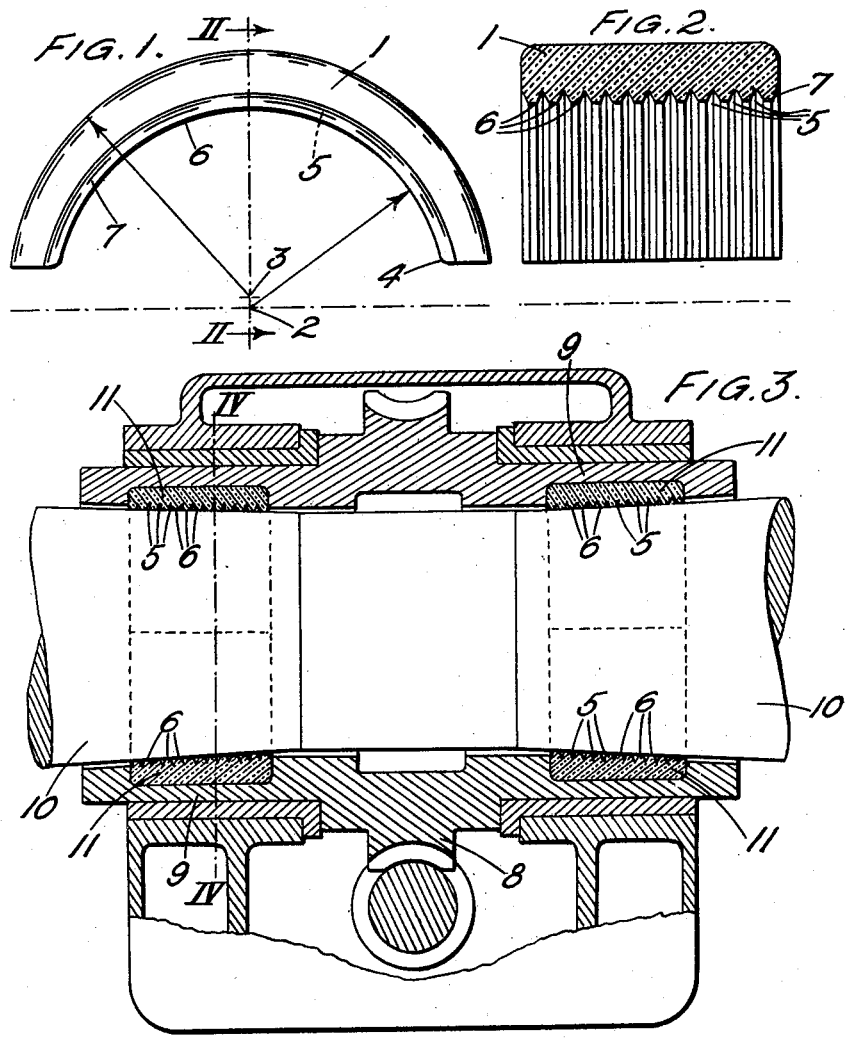
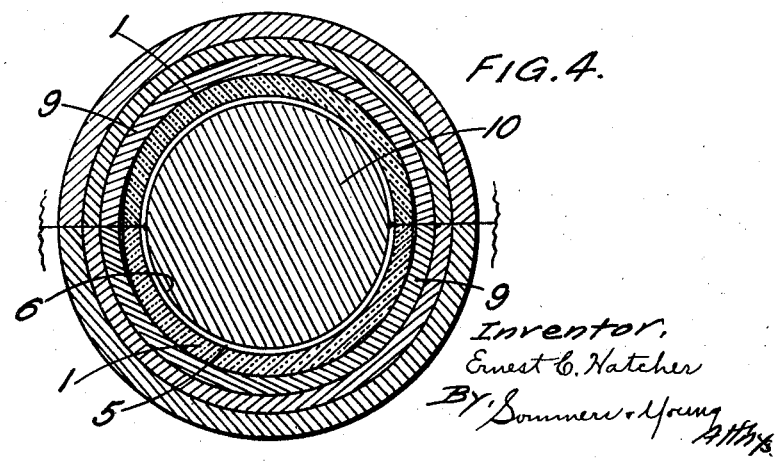
Inventor,
Ernest C. Hatcher
By Sommers & Young
Attys.

Patented Sept. 24, 1940

2,215,926

UNITED STATES PATENT OFFICE 2,215,926

RESILIENT SLEEVE IN TRANSMISSION GEARING

Ernest Charles Hatcher, Northwood, England, assignor to J. Stone & Company Limited, Deptford, England, a company of Great Britain Application January 3, 1938, Serial No. 183,218
In Great Britain January 1, 1937

3 Claims. (Cl. 64—27)

(Granted under the provisions of sec. 14, act of March 2, 1927; 357 O. G. 5)

This invention concerns improvements relating to the mounting of annular transmission elements, particularly gear-wheels, which are divided so that they can be clamped upon axles, shafts or the like (hereinafter referred to as axles) with the aid of sleeve-like resilient mountings secured under radially exerted compression between the said elements and axles. Thus, for example, my Patent No. 1,857,020 describes the use of a sleeve-shaped resilient rubber body embracing a vehicle-axle and having clamped over it a gear wheel through which a drive derived from the said axle through a universal coupling is transmitted to auxiliary apparatus supported or suspended below the vehicle.

A drawback of such resilient bodies is that it is difficult to ensure that they are under a sufficient compression when the clamping means has been tightened. This arises from the fact that the resilient materials which are appropriate for the purpose are capable of deforming to a considerable extent without the required compression being developed in them. This factor could be properly provided for only in cases where the dimensions of the gap or space in which the body is to be compressed are precisely known and constant. In the example referred to above, however, the diameter of the axle is, in particular, a dimension which in practice will vary appreciably from case to case. There are also other practical difficulties such as the limitations of the clamping means which it is possible to provide. It is an object of the present invention to provide resilient sleeve mountings which can be more readily placed under compression, even in cases where there are practical difficulties such as are referred to above.

According to the present invention, there is provided, in combination with a divided annular element, for example a gear-wheel, clamped substantially co-axially on an axle, a sleeve-like resilient mounting secured under radially exerted compression between the said element and axle and comprising a plurality of narrow ribs extending substantially circumferentially in relation to the axle and with their crests only in contact with the adjacent non-complementary surface of the said axle or element. By a non-complementary surface is to be understood one not provided with grooves into which the ribs engage. If desired, ribs may be provided in contact with the adjacent surfaces of both the axle and the annular element.

More particularly, according to the invention, there is provided in combination with a divided transmission wheel or hub-body clamped round the axle of a railway vehicle a sleeve-like resilient mounting clamped under radial compression on the axle by the wheel or hub-body and comprising at one or both of its cylindrical faces a plurality of ribs extending circumferentially of the axle and with their crests only in contact with the adjacent non-complementary surfaces of the said axle and/or the said wheel or hub-body. A specific example of a sleeve intended to be employed as a resilient mounting for a gear-wheel upon a vehicle axle and in transmission gearing of the kind hereinbefore mentioned will now be described with reference to the accompanying drawing, in which—

Fig. 1 shows a half sleeve in end elevation,

Fig. 2 is a section on the line II—II in Fig. 1,

Fig. 3 is a more or less diagrammatic longitudinal section of a gear-wheel mounted upon an axle by means of two sleeves, and Fig. 4 is a cross section on the line IV—IV in Fig. 3.

Sleeves to be employed for the purpose set forth are commonly each made in two halves to permit application to the axle. In the example illustrated, the half sleeve 1 has, uncompressed, an external radius of 3¾ ins. and an internal radius of 3⅛ ins. The internal radius, is struck from a centre 2 (Fig. 1) eccentric to the centre 3 of the external radius by ⅛ in. Thus the overall thickness of each sleeve section tapers from ¾ in. at the middle to about ⅝ in. towards the edges. In addition, the internal corners 4 at the said edges are slightly chamfered. Each uncompressed section is not a complete half of a hollow cylinder, but is a section cut off by a longitudinal plane distant by ½ in. from the centre 3. In a sleeve-section of these dimensions and 2⅞ ins. long, a suitable provision is eight V-shaped internal circumferential grooves 5 of ⅛ in. depth and ⅛ in. width at the top: ⅛ in. lands 6 separate the grooves and the circular edges 7 are bevelled at the same angle as the sides of the grooves. The sleeve-section is moulded from oil and heat resistant rubber or rubber-composition.

Figs. 3 and 4 show a worm-wheel 8 with a longitudinally divided shell or hub 9 mounted upon a vehicle-axle 10 by two sleeves 11 each composed of two half-sleeves 1 such as have been described. As will be seen from Fig. 4, the deformation of the sleeve-halves produced under radial compression when the divided wheel-hub is clamped over the axle brings the edges of the said halves into abutting relationship. The above-described tapering of the sleeve-halves towards their edges serves to prevent dragging of the rubber at the point of abutment when the halves of the hub are drawn together by the clamping means. The production of a required degree of compression in the material of the sleeves is ensured by the presence of the grooves 5 in spite of difficulties hereinbefore referred to. As shown, the sleeves are mounted over slightly tapered portions of the axle 10. In spite of the variation in axle-diameter thus presented, the sleeves are placed under adequate compression. Only the crests 6 of the ribs between the grooves 5 are in contact with the non-complementary adjacent surfaces of the axle.

I claim:

1. In a rotary power transmission mechanism of the kind in which rotary power is transmitted between two elements, namely, a vehicle axle and a divided gear wheel clamped over said axle through the intermediary of a rubber sleeve between said axle and gear wheel, the improvement characterized in that the rubber sleeve is divided longitudinally into two halves, each of said halves tapering in thickness from its middle longitudinal part towards its longitudinal side edges so as to be thicker along the said middle portion than along said edges, and each of said half-sleeves having a cylindrically shaped surface formed with circumferentially running grooves.

2. In a rotary power transmission arrangement in which power is transmitted between an axle element and a divided annular gear wheel, disposed substantially co-axially with and clamped around the axle, through the intermediary of a sleeve-like resilient mounting secured under radially-exerted compression between the said elements, the improvement characterized in that said mounting member has a surface formed with a plurality of narrow ribs extending substantially circumferentially in relation to the axle element with their crests only in contact with the adjacent surface of one of the said elements, the said surface of said elements being non-complementary to the said surface of the mounting, the said resilient mounting being divided longitudinally into at least two parts and the thickness of each part tapering from its middle longitudinal portion towards its longitudinal edge portions so as to be thicker along the said middle portion than along said edges.

3. In a rotary power transmission arrangement in which power is transmitted between an axle element and a divided annular gear wheel, disposed substantially co-axially with and clamped around the axle element through the intermediary of a sleeve-like resilient mounting secured under radially-exerted compression between the said elements, the improvements characterized in that said mounting member has a surface formed with a plurality of narrow ribs extending substantially circumferentially in relation to the axle element with their crests only in contact with the adjacent surface of one of the said elements, said contacted adjacent surface being non-complementary with said surface of the mounting member, the said resilient mounting being divided longitudinally into at least two parts, the said parts being so shaped as to be thicker along their longitudinal middle portion than along their longitudinal edge portions and so as to form an incomplete sleeve in the uncompressed condition but to form substantially a complete sleeve when compressed between the said elements.

ERNEST CHARLES HATCHER.